United States Patent [19]
BeVier

[11] Patent Number: 4,812,147
[45] Date of Patent: Mar. 14, 1989

[54] MULTICOMPONENT ADSORPTION PROCESS

[75] Inventor: William E. BeVier, Kenmore, N.Y.

[73] Assignee: Union Carbide Corporation, Danbury, Conn.

[21] Appl. No.: 796,240

[22] Filed: Nov. 8, 1985

[51] Int. Cl.⁴ .................................... B01D 53/04
[52] U.S. Cl. ............................................ 55/25; 55/31; 55/34; 55/60; 55/62; 55/68; 55/75; 55/77
[58] Field of Search ............... 55/25, 26, 31, 33–35, 55/58, 60, 62, 68, 74, 75, 77

[56] References Cited

U.S. PATENT DOCUMENTS

| 2,910,139 | 10/1959 | Matyear, Jr. | 55/33 X |
| 2,992,703 | 7/1961 | Vasan et al. | 55/62 |
| 3,102,013 | 8/1963 | Skarstrom | 55/31 |
| 3,109,722 | 11/1963 | Dow | 55/31 X |
| 3,150,942 | 9/1964 | Vasan | 55/33 X |
| 3,225,516 | 12/1965 | Smith et al. | 55/58 X |
| 3,237,379 | 3/1966 | Kant et al. | 55/58 |
| 3,306,006 | 2/1967 | Urban | 55/33 X |
| 3,563,704 | 2/1971 | Torrence | 55/79 X |
| 3,689,212 | 9/1972 | Petit et al. | 423/239 |
| 3,719,025 | 3/1973 | Heinze et al. | 55/31 |
| 3,720,042 | 3/1973 | Simonet | 55/62 X |
| 3,738,084 | 6/1973 | Simonet et al. | 55/31 |
| 3,841,058 | 10/1974 | Templeman | 55/33 |
| 3,967,464 | 7/1976 | Cormier et al. | 62/13 |
| 4,092,131 | 5/1978 | Rohde | 55/33 |
| 4,233,038 | 11/1980 | Tao | 55/33 |
| 4,249,915 | 2/1981 | Sircar et al. | 55/26 |
| 4,259,094 | 3/1981 | Nagai et al. | 55/181 |
| 4,263,028 | 4/1981 | Ohlmeyer et al. | 55/79 X |
| 4,299,596 | 11/1981 | Benkmann | 55/26 |
| 4,472,178 | 9/1984 | Kumar et al. | 55/25 |
| 4,511,375 | 4/1985 | BeVier | 55/28 |
| 4,526,877 | 7/1985 | Acharya et al. | 502/60 |

FOREIGN PATENT DOCUMENTS

| 4465 | 10/1979 | European Pat. Off. | 55/33 |
| 51072 | 11/1976 | Japan . | |
| 70542 | 1/1979 | Japan . | |
| 137274 | 2/1984 | Japan . | |

Primary Examiner—Robert Spitzer
Attorney, Agent, or Firm—Stanley Ktorides

[57] ABSTRACT

A process to absorb more than one component from a gaseous stream comprising passing the gaseous stream sequentially in contact with separate and distinct adsorbent masses wherein not all of the more strongly sorbed component is removed in a single adsorbent mass. The process exhibits improved overall efficiency over conventional multicomponent adsorption processes.

26 Claims, 1 Drawing Sheet

MULTICOMPONENT ADSORPTION PROCESS

TECHNICAL FIELD

This invention relates to the field of cleaning a gaseous stream of more than one component by adsorption and is an improvement whereby energy efficiency is increased.

BACKGROUND ART

It is often necessary to remove more than one component from a gaseous stream so as to clean the gaseous stream, recover one or more of the components, or both. Examples of such situations include the upgrading of natural gas, the purification of natural gas before liquefaction, removal of contaminants from air for breathing, and removal of high boiling components from air before cryogenic air separation. A widely used method to carry out such component removal is to contact the gaseous stream with adsorbent to transfer components from the gaseous stream to the adsorbent. Generally the adsorbent is in a fixed or moving bed.

There are essentially two types of processes known to the art to carry out such a multicomponent adsorption. In the first such type, the gaseous stream is passed through one mass of adsorbent and all of the components are adsorbed by the single adsorbent mass. Such a process has the advantage of low capital costs because only a single adsorbent bed and desorption scheme is necessary. However because the adsorbent equilibrium loading is reduced, such a process requires a relatively large amount of adsorbent to remove effectively all of the components. In addition, desorption energy requirements are quite high. In the second such type of multicomponent adsorption process, the gaseous stream is passed through more than one mass of adsorbent and each component is substantially completely removed from the gaseous stream in a distinct adsorbent mass. Adsorbent requirement is reduced in such a system because the more strongly sorbed component does not interfere with the removal of the less strongly sorbed component. However, desorption energy requirements for such a system are relatively high.

It is therefore an object of this invention to provide an improved process for the removal by adsorption of more than one component from a gaseous stream.

It is a further object of this invention to provide an improved process for the removal by adsorption of more than one component from a gaseous stream which is more energy efficient than heretofore known processes.

SUMMARY OF THE INVENTION

The above and other objects which will become apparent to one skilled in the art upon a reading of this disclosure are attained by the instant invention which for a two component system is:

A process for the removal by adsorption of more than one component from a gaseous stream comprising:

(a) passing a gaseous stream containing a first component and a second component, wherein the first component is more strongly sorbed than the second component, in contact with a first mass of adsorbent to transfer the majority of the first component to the first mass of adsorbent; and (b) passing the resulting gaseous stream in contact with a second mass of adsorbent, separate from the first mass of adsorbent, to transfer substantially all of the remaining first component and substantially all of the second component to the second mass of adsorbent.

As used herein, the term "component" means a chemically identifiable part of a gaseous stream which is removable from the gaseous stream by adsorption.

As used herein, the term "majority" means from at least 50 percent to less than 100 percent.

As used herein the term "fixed bed" means a bed in which the adsorbent particles are stationary relative to the vessel containing them.

As used herein, the term "moving bed" means a bed in which the adsorbent particles change position relative to the vessel containing them.

DETAILED DESCRIPTION

Figure 1:
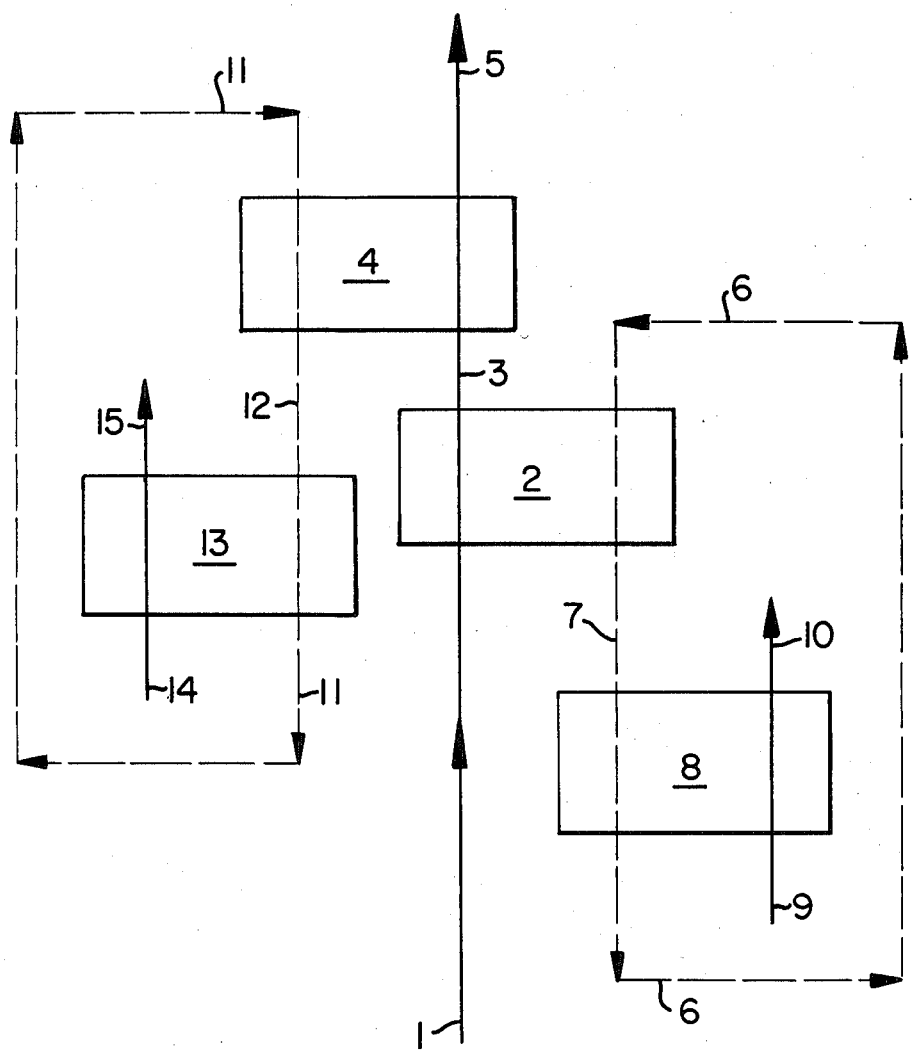
FIG. 1 is a schematic flow diagram of one preferred embodiment of the process of this invention wherein the gaseous stream is cleaned by passage through two moving adsorbent beds.

The process of this invention will be described in detail with reference to the drawing and with an embodiment wherein there are two components to be removed from the gaseous stream.

Referring now to FIG. 1, gaseous stream 1 contains a first and second component wherein the first component is more strongly sorbed than the second component. Examples of such a gaseous stream include a gaseous stream of air having a first component water and a second component carbon dioxide, natural gas having a first component water and a second component carbon dioxide, hydrogen having a first component ethylene and a second component methane, and helium having a first component carbon dioxide and a second component methane. Gaseous stream 1 is passed in contact with a first mass of adsorbent in adsorber 2 which may be any effective means such as a fixed bed or a moving bed. If adsorber 2 is a moving bed it may be cocurrent, wherein the adsorbent and the gaseous stream move through the adsorber in the same direction, or it may be countercurrent wherein the adsorbent and the gaseous stream move through the adsorber in different directions. In the embodiment illustrated in FIG. 1, adsorber 2 is a countercurrent moving bed with adsorbent 6 passing countercurrent to gaseous stream 1.

By contact with the first mass of adsorbent by the gaseous stream, the majority of the first component is transferred to the first mass of adsorbent. Preferably at least about 90 percent, most preferably at least about 95 percent, but preferably at most about 99.5 percent of the first component is transferred to the first mass of adsorbent. There is essentially no transfer of the second component to the first adsorbent mass because the first component is more strongly sorbed and therefore none of the second component will be adsorbed until substantially all of the first component has been adsorbed.

As is known in the art, the extent of adsorption of the first component on the first mass of adsorbent is dependent on the process conditions, including the system pressure, temperature, amount of adsorbent available per unit of treated gas, the initial or residual loading of the adsorbent with regard to the removed component, and the extent of equilibrium between the treated gas and the adsorbent. The specific design for any given treated gas-adsorbent system will depend on the system characteristics such as the governing loading curve for the adsorbent, the type of adsorption unit, and the type of regeneration unit. The system design would be controlled by those characteristics and the usual engineering design tradeoffs between equipment, material, and operating costs. The behavior of a given component on a given adsorbent is determined by experiment and can be represented on a loading curve of "Amount of Component Adsorbed per Unit Adsorbent" versus "Partial pressure of component over Adsorbent". Loading can be "lb moles gas" or "lbs gas per lb adsorbent" versus pressure "psia" for pure component or "concentration×total pressure" for a gas mixture. The basic principles of sorption separation processes are described in "The Chemical Engineer's Handbook" Fifth Edition, Editors R. H. Perry and C. H. Chilton, Section 15 "Adsorption and Ion Exchange".

Referring back to FIG. 1, resulting gaseous stream 3 is then contacted with a second mass of adsorbent which is separate from the first adsorbent mass. FIG. 1 illustrates the second adsorbent mass as being in adsorber 4 which, like adsorber 2, may be any effective means such as a fixed or countercurrent, cocurrent or even a crossflow moving bed. In the embodiment illustrated in FIG. 1, adsorber 4 is a countercurrent moving bed with adsorbent 11 passing countercurrent to gaseous stream 3. By contact with the second mass of adsorbent by the gaseous stream, substantially all of the remaining first component and substantially all of the second component undergo transfer to the second mass of adsorbent. The resulting gaseous stream 5 containing substantially none of either first or second component may be recovered, further processed, otherwise employed or simply released.

The first and second adsorbent may be any effective adsorbent. Preferably the first and second adsorbent mass comprise the same type of adsorbent but this is not absolutely necessary. Examples of types of adsorbents suitable for use as adsorbent masses in the process of this invention include molecular sieve, silica gel, activated carbon, and alumina. When the adsorption process is a moving bed process a preferred adsorbent is attrition resistant molecular sieve disclosed and claimed in U.S. Pat. No. 4,526,877—Acharya et al, or silica and alumina gels which are available in hard spherical form and tend to be attrition resistant.

The process of this invention differs from heretofore known multicomponent adsorption systems having two adsorbent beds in that the first component is not completely removed in the first bed and is thus allowed to contaminate the second bed. This has heretofore been thought to be disadvantageous because of the burden it places on the second bed to completely adsorb the second and less strongly sorbed component. However, it has been unexpectedly discovered that such a seemingly disadvantageous scheme is surprisingly more energy efficient overall. This advantageous result will now be more fully explained.

A commerically viable adsorption system includes the cleaning of the adsorbent so that it may be employed anew to adsorb components from a gaseous stream. There are a number of known ways to clean adsorbent such as by pressure reduction or isobaric temperature increase of the adsorbent, simple purging of the adsorbent with large quantities of inert gas, or combinations of these systems. The energy required to clean the adsorbent is referred to as the desorption energy. All of these adsorbent cleaning systems exhibit the engineering principle that the first increments of contaminant may be removed from the adsorbent with relatively little energy usage, while later increments of contaminant require larger increments of desorption energy and the last increments of contaminant require very large increments of desorption energy. In a conventional system employing two adsorbent beds, both beds require nearly complete cleaning, i.e. to low residual loading, in order to successfully carry out the complete removal of each separate component of the gaseous stream in each separate bed. However, in the process of this invention, the first adsorber need not be completely cleaned, i.e. it may have high residual loading, because it is not employed to remove the first component completely. This saves considerable desorption energy since the first adsorber is desorbed in the region of relatively low incremental desorption energy. Of course, this procedure places a burden on the second adsorber because now it gets contaminated with the first component which makes removing the second component from the gaseous stream more difficult than it would be in a conventional system where there is no contamination of the second adsorber with first component. However, it has been unexpectedly found that the savings in desorption energy for the first bed more than compensate for the added burden placed on the second adsorber and thus the process of this invention enables unexpectedly superior results in the form of increased overall energy efficiency, over conventional systems.

FIG. 1 illustrates one type of desorption system. Referring back now to FIG. 1, adsorbent 7 containing the bulk of the first component is passed to desorber 8 which may be any effective desorber such as a pressure swing or temperature swing desorber having one or more stages. A preferred desorber and desorption process is disclosed and claimed in U.S. Pat. No. 4,511,375—BeVier. In FIG. 1, first desorber 8 is shown as a single stage stripper wherein purge gas 9 passes countercurrent to adsorbent 7 to produce high residual loaded adsorbent 6 and first component-containing-purge gas 10. The purge gas may be any effective inert gas such as nitrogen or may be a fraction of the cleaned feed gas itself. Desorber 13 like desorber 8, may be any effective desorber and is shown in FIG. 1 as a simple stripper wherein purge gas 14 passes countercurrent to adsorbent 12 which contains the remaining part of the first component and all of the second component. The desorption in second desorber 13 results in low residual loaded adsorbent 11 and purge gas 15 containing both first and second component. In a preferred embodiment at least some of the purge gas exiting from the second desorber is used to make up at least part, and most preferably all, of the purge gas requirement entering the first desorber. In a further preferred embodiment, heat of desorption for both of the desorbers is added in a simple heater to clean purge gas prior to entering the second desorber. If a multiple zone desorber is employed, this heat addition takes place before the purge gas enters the stripping section. No further heat addition to the first desorber purge gas is necessary if the purge gas exiting the second desorber makes up at least part of the purge gas entering the first desorber.

The following example serves to further demonstrate the advantages attainable by use of the process of this invention. The example is presented for illustrative purposes and is not intended to be limiting.

Air at 40° F. and 100 pounds per square inch absolute (psia) containing 760 parts per million (ppm) of water as a first component and 400 ppm of carbon dioxide as a second component is fed to a first adsorption bed at a rate of 100,000 pounds per hour. The first adsorption bed is a moving bed through which 13×molecular sieve adsorbent is passed countercurrently to the air at a rate of 740 pounds per hour. The adsorbent entering the first adsorption bed has a residual loading of 14 percent water. It has a loading of 22 percent water exiting the first adsorption bed and it contains virtually no carbon dioxide. About 99 percent of the water and essentially none of the carbon dioxide in the air is transferred to the adsorbent by passage through the first adsorbent bed. The air exiting the first adsorber is passed countercurrently through a second adsorber against 13×molecular sieve which has a residual water loading of 2 percent. The sieve flowrate through the second adsorber is 1940 pounds per hour. The air exits the second adsorber containing less than 2 ppm of both water and carbon dioxide. The theoretical desorption energy for the first adsorber is 94,000 BTU per hour and for the second adsorber is 16,000 BTU per hour for a combined desorption energy requirement of 110,000 BTU per hour.

For comparative purposes the theoretical desorption energy was calculated for conventional process systems cleaning a similar air stream. For a conventional system wherein each component is completely removed from the air in separate adsorbers, the theoretical desorption energy is 126,000 BTU per hour, and for a conventional system wherein both components are removed in a single adsorber, the theoretical desorption energy is 140,000 BTU per hour. It is thus seen that the process of this invention has a desorption energy requirement 14 and 27 percent respectively less than the requirements for the described conventional systems for the defined air stream.

The process of this invention has been described in detail with reference to certain specific embodiments and in particular with reference to a two component two adsorber system. It is understood that there are other embodiments within the scope and spirit of the claims other than those embodiments specifically described. For example, the process of this invention may be employed to clean a gaseous stream of three or more components by using respectively three or more adsorbent beds. Thus the process of this invention may be generalized as follows:

A process for the removal by adsorption of more than one component from a gaseous stream comprising:

(a) providing a gaseous stream containing at least two components, said components ranked by order of sorption as first through $N^{th}$ component with the first component being the most strongly sorbed and the $N^{th}$ component being the least strongly sorbed;

(b) passing the gaseous stream in contact with a first mass of adsorbent to transfer the majority of the first component to the first mass of adsorbent;

(c) passing the resulting gaseous stream in contact with a series of $N-2$ separate adsorbent masses, each adsorbent mass being associated with one component ranked 2 through $N-1$, wherein in each serial adsorbent mass the majority of its associated component is removed from the stream to the said serial adsorbent mass along with the remainder of the component, more strongly sorbed than the associated component, which is still in the gaseous stream, while essentially none of the component(s) less strongly sorbed then the associated component are removed from the gaseous stream; and (d) passing the gaseous stream resulting from step (c) in contact with the $N^{th}$ adsorbent mass wherein substantially all of the remainder of the $N-1^{th}$ component and substantially all of the $N^{th}$ component are transferred to the $N^{th}$ adsorbent mass.

Examples of the process of this invention wherein there are three components to be removed from a gaseous stream, i.e., wherein $N=3$, include air having a first component water a second component carbon dioxide and a third component hydrocarbon, and argon having a first component water vapor a second component carbon dioxide and a third component nitrogen.

I claim:

1. A process for the removal by adsorption of more than one component from a gaseous stream comprising:
   (a) passing a gaseous stream containing two components, a first component and a second component, wherein the first component is more strongly sorbed than the second component, in contact with a first mass of adsorbent to transfer the majority but not all of the first component to the first mass of adsorbent;
   (b) passing the resulting gaseous stream in contact with a second mass of adsorbent, separate and spaced from the first mass of adsorbent, to transfer substantially all of the remaining first component and substantially all of the second component to the second mass of adsorbent;
   (c) regenerating the second mass of adsorbent to a low residual loading with respect to the first component; and
   (d) regenerating the first mass of adsorbent to a high residual loading.

2. The process of claim 1 wherein at least 90 percent of the first component is transferred to the first mass of adsorbent.

3. The process of claim 1 wherein at most about 99.5 percent of the first component is transferred to the first mass of adsorbent.

4. The process of claim 1 wherein at least one of the first and second mass of adsorbent contacts the gaseous stream in a fixed bed.

5. The process of claim 1 wherein at least one of the first and second mass of adsorbent contacts the gaseous stream in a moving bed.

6. The process of claim 5 wherein the contact in the moving bed is cocurrent.

7. The process of claim 5 wherein the contact in the moving bed is countercurrent.

8. The process of claim 1 wherein the first and second mass of adsorbent are the same type of adsorbent.

9. The process of claim 1 wherein the first and second mass of adsorbent are different types of adsorbent.

10. The process of claim 1 wherein at least one mass of adsorbent is molecular sieve.

11. The process of claim 1 wherein the gaseous stream is air, the first component is water vapor and the second component is carbon dioxide.

12. The process of claim 1 wherein the gaseous stream is natural gas, the first component is water vapor, and the second component is carbon dioxide.

13. The process of claim 1 wherein the gaseous stream is hydrogen, the first component is ethylene, and the second component is methane.

14. The process of claim 1 wherein the gaseous stream is helium, the first component is carbon dioxide and the second component is methane.

15. The process of claim 1 wherein at least one of the regenerations is carried out by changing the pressure on the adsorbent mass.

16. The process of claim 1 wherein at least one of the regenerations is carried out by changing the temperature of the adsorbent mass.

17. The process of claim 1 wherein at least one of the regenerations is carried out by contacting purge gas in countercurrent flow with the adsorbent mass.

18. The process of claim 17 wherein the purge gas is nitrogen.

19. The process of claim 17 wherein both regenerations are carried out by contacting purge gas in countercurrent flow with adsorbent mass.

20. The process of claim 19 wherein at least a part of the purge gas after regeneration of the second adsorbent mass is employed to make up at least part of the purge gas requirement for the regeneration of the first adsorbent mass.

21. The process of claim 19 wherein at least part of the purge gas after regeneration of the second adsorbent mass is employed to make up all of the purge gas requirement for the regeneration of the first adsorbent mass.

22. The process of claim 19 wherein the purge gas is heated prior to contact with the second adsorbent mass.

23. A process for the removal by adsorption of more than one component from a gaseous stream comprising:
 (a) providing a gaseous stream containing at least two components, said components ranked by order of sorption as first through $N^{th}$ component with the first component being the most strongly sorbed and the $N^{th}$ component being the least strongly sorbed;
 (b) passing the gaseous stream in contact with a first mass of absorbent to transfer the majority but not all of the first component to the first mass of adsorbent;
 (c) passing the resulting gaseous stream in contact with a series of $N-2$ separate and spaced adsorbent masses, each adsorbent mass being associated with one component ranked 2 through $N-1$, wherein in each serial adsorbent mass the majority but not all of its associated component is removed from the stream to the said serial adsorbent mass along with the remainder of the component, more strongly sorbed than the associated component, which is still in the gaseous stream, while essentially none of the component(s) less strongly sorbed than the associated component are removed from the gaseous stream;
 (d) passing the gaseous stream resulting from step (c) in contact with the $N^{th}$ adsorbent mass wherein substantially all of the remainder of the $N-1^{th}$ component and substantially all of the $N^{th}$ component are transferred to the $N^{th}$ adsorbent mass; and
 (e) regenerating the first mass of adsorbent to a higher residual loading with respect to the first component then the residual loading of any of the other adsorbent masses.

24. The process of claim 23 wherein the gaseous stream contains three components to be removed by adsorption.

25. The process of claim 24 wherein the gaseous stream is air, the first component is water vapor, the second component is carbon dioxide and the third component is a hydrocarbon gas.

26. The process of claim 24 wherein the gaseous stream is argon, the first component is water vapor, the second component is carbon dioxide and the third component is nitrogen.

* * * * *